United States Patent [19]

Anderson et al.

[11] 3,996,448
[45] Dec. 7, 1976

[54] DATA COLLECTION SYSTEM

[75] Inventors: Jarl A. Anderson, Northboro; Kenneth J. Bate, Natick; Victor Blumenthal, Framingham; James E. King, Sudbury, all of Mass.; Eugene F. Kusekoski, Nashua, N.H.; Nunzio Napoleone, Worcester, Mass.

[73] Assignee: Dennison Manufacturing Company, Framingham, Mass.

[22] Filed: Apr. 10, 1975

[21] Appl. No.: 566,837

[52] U.S. Cl. .................. 235/61.6 R; 235/61.11 D; 360/101
[51] Int. Cl.² .................. G06K 15/00; G06K 7/08; G11B 21/02
[58] Field of Search ............. 235/61.7 B, 61.7 R, 235/61.6 R, 61.11 D, 61.11 E; 360/101

[56] References Cited
UNITED STATES PATENTS

| | | | |
|---|---|---|---|
| 3,643,068 | 2/1972 | Mohan et al. | 235/61.11 E |
| 3,663,800 | 5/1972 | Myer et al. | 235/61.11 E |
| 3,761,682 | 9/1973 | Barnes et al. | 235/61.7 B |
| 3,778,595 | 12/1973 | Hatanaka et al. | 235/61.7 B |
| 3,806,705 | 4/1974 | Reilly et al. | 235/61.7 B |
| 3,818,187 | 6/1974 | Lovendusky et al. | 235/61.7 B |
| 3,845,277 | 10/1974 | Voss et al. | 235/61.7 B |

*Primary Examiner*—Daryl W. Cook
*Attorney, Agent, or Firm*—George E. Kersey

[57] ABSTRACT

A data collection system comprises magnetically encoded tickets and reading/writing/data collection elements -- one or more magnetic transducers -- for reading from (and/or writing on) the tickets together with means for manual input of data onto storage media while selectively maintaining running totals. The tickets are fed into a reading/writing apparatus comprising a self-aligning means, a pivotal platform movable between loading and read/write positions and further comprising a motor driven capture and eject mechanism. The tickets are either automatically ejected by the motor after reading/writing or manually releasable if not capable of reading/writing or eject. The ticket is maintained in effective, reliable reading contact with the transducer(s) during reading/writing.

4 Claims, 11 Drawing Figures

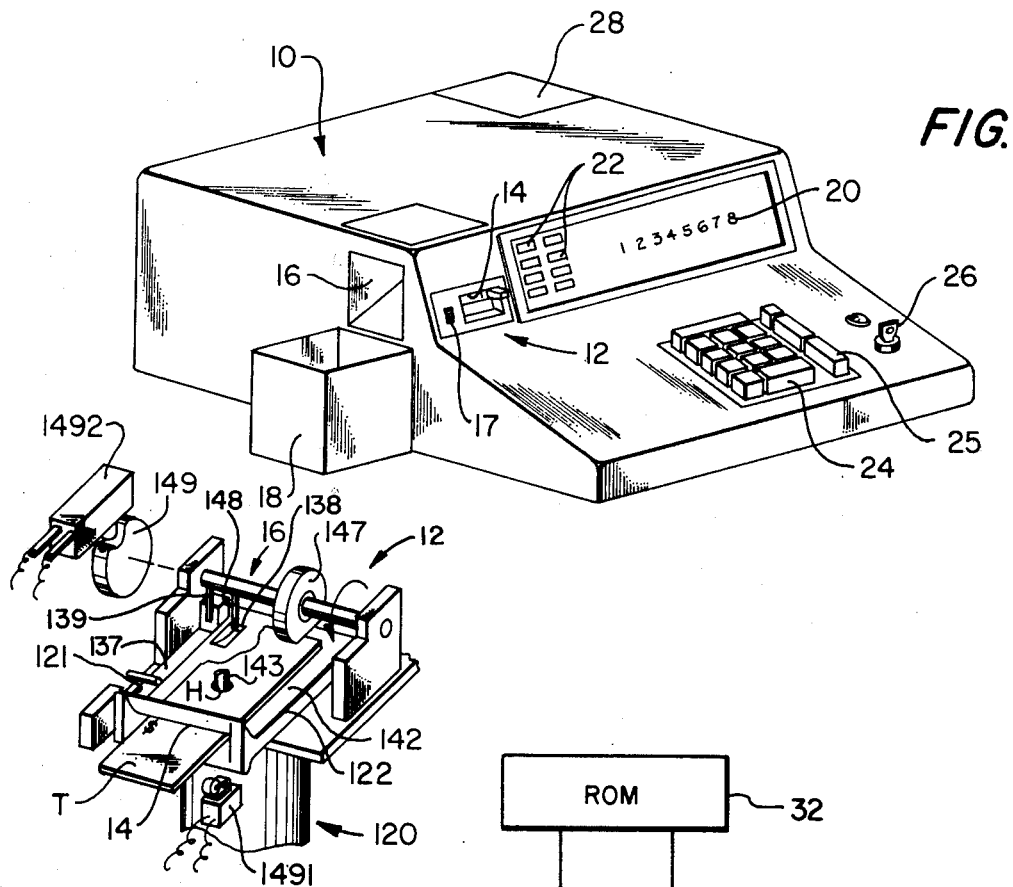
FIG. 1
FIG. 1A
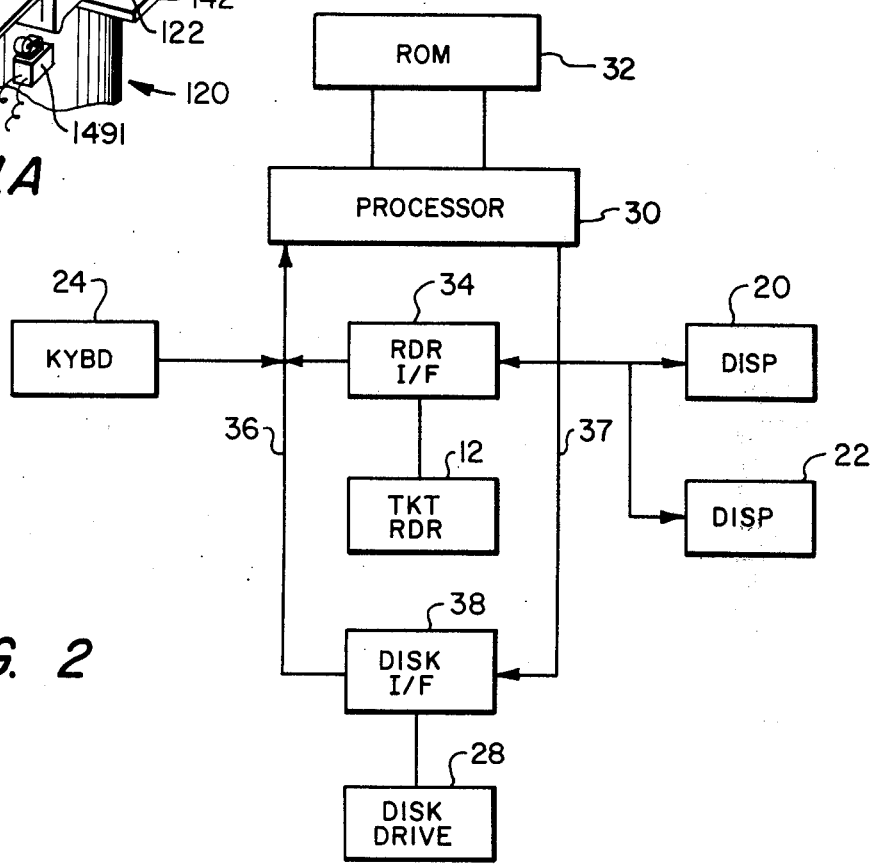
FIG. 2

DATA COLLECTION SYSTEM

BACKGROUND OF THE INVENTION

The present invention relates to data collection for distribution control, more particularly in connection with wholesale/retail distribution of goods or like distribution control functions as adumbrated below, and provides substantial improvement in efficiency of data collection together with reduction of cost and time for associated data processing through maintenance of data collection events at decentralized locations in the first practical and economic fashion consistent with high volume and variety of data collection requirements.

Some retail merchandise data control systems include use of magnetic oxide coated (or otherwise suited to be encoded, e.g. by hole punching or marking with OCR readable notation) tickets tied to or associated with each piece of goods and encoded with pricing and inventory control data. A batch reader such as the commercially available MTR 200 reader may be used to retrieve data such as price and identification and inventory control numbers from a periodic accumulation of tickets and to store such information per se and/or aggregate totals. The equipment also reformats the data for use in EDP systems. Such equipment includes a mincomputer which provides operation control through preprogrammed commands or in response to commands in conversational mode entered through input/output terminal. The terminal is also utilized to display system status information for flash reports. The system may also include a re-mark terminal (e.g. for entry of price change information on the oxide coating). A tape or disk (or other data storage medium) data store sequentially records the information accumulated from ticket reading. This state of the art is further disclosed in the prior U.S. Pat. of common assignment herewith, Nos. 3,103,666, 3,517,612, 3,553,440, 3,626,462, 3,662,362, 3,689,065, 3,715,745, 3,727,031, 3,761,687, 3,774,904, 3,841,624, 3,742,844, 3,771,670, 3,797,386, 3,804,007, 3,806,715 relating to tickets and their marking and reading for distribution control and the like.

It is an important object of the invention to reduce shipping, handling and/or time delay involved in utilization of systems of the class described.

It is a further object of the invention to maximize in-store data collection consistent with the preceding object.

It is a further object of the invention to provide interactive operation easily mastered by relatively unskilled operators consistent with one or both of the preceding objects.

It is a further object of the invention to provide multi-ticket processing at high rates of tickets per hour consistent with one or more of the preceding objects.

It is a further object of the invention to allow keyed data entry consistent with one or more of the preceding objects.

It is a further object of the invention to accumulate subtotals and totals of data entered consistent with one or more of the preceding objects.

SUMMARY OF THE INVENTION

According to the present invention a data processing system comprises tickets associated with each item to be controlled (e.g. pieces of retail store merchandise) and decentralized data collection devices located at, or essentially at, the lowest level of distribution (e.g. retail stores) where tickets are detached from pieces and data is collected therefrom by reading, converting the analog signals read to digital signals formatted for EDP storage and processing. Then, at relatively short intervals, usually a day or less, the tickets are fed into the devices for semi-automatic batch reading. Related data may also be keypunched at the devices. The devices contain cumulative data storage media such as discs, preferably floppy discs or "diskettes," cassettes, tapes, fiche cards, punched cards or paper tapes. The ticket data may be machine recorded in form for reading by magnetic, optical or electrostatic transducers, but preferably comprises a magnetic oxide coating. Visible information is also printed on the tickets.

In data collection, the device operator may supersede machine recorded information of the tickets by keypunching in reliance on the visual information of the tickets or amendments thereto (e.g. gummed overlays showing markdown prices), or other sources of information. The operator may perform key in data routines without tickets at all. With this flexibility, a complete train of several relevant data categories can be recorded on one or more diskettes (or other data storage media) and shipped to a central data point. The data recorded may include totals or subtotals of data elements read from tickets or keyed in. All data may be displayed while automatically reading or keying in for verification and for local availability of data.

The devices also comprise hardware and software components which interactively display function prompting and status information words, as well as numeric information, to the operator to allow usage by a wide variety of personnel with limited training. The prompt functions are preselected by automatic means.

The tickets are processable at high rates, consistent with operational flexibility, by high speed transducer means and a high speed semi-automatic ticket handling reader component of the devices. The tickets are fed singly to a supporting carrier containing a flexible guide (e.g. a spring loaded pin) which yields until it can engage a ticket locating means (e.g. a hole or notch in the ticket). After properly locating the ticket on the carrier, the carrier is moved to place the ticket into operative relationship with the transducer(s) for reading and/or writing on the encoding portion of the ticket. The ticket and transducer are relatively scanned to serially expose the whole length of one or more data tracks of the ticket to the transducer(s). Then upon automatic recognition of completion of reading, the device is programmed to prompt entry of data read and to automatically move the carrier so that the ticket is out of operative relationship with the transducer(s). The carrier moves to a ticket eject position, preferably coincident with the ticket load position. There, the ticket is automatically captured and ejected while the operator is loading the next ticket. The automatic capture and eject mechanism preferably comprises a friction wheel driven by a motor which may be started and stopped or clutched and declutched for control. Air jet blasts may also be used for ejection.

The diskettes, or other media, are delivered to central data processing systems for complex rearrangement and processing utilizing equipment which is not feasible to decentralize. The decentralized, batched, data collection system of the present invention avoids the cost and delays of sending tickets, per se, by mail and allows on-site adjustment and interpretation in connection with ticket data ambiguities. For archival purposes, the tickets are retained at locations where they have the greatest significance. The diskettes may be erased and reused after central data processing.

These and other objects, features and advantages of the invention will be more clearly understood from the following detailed description of preferred embodiments, taken in connection with the accompanying drawings, in which:

BRIEF DESCRIPTION OF THE DRAWING

FIG. 1 is an isometric view of the data collection apparatus in accordance with a preferred embodiment of the invention and FIG. 1A is an expanded isometric view of a ticket reader subassembly of the apparatus;

FIG. 2 is a block diagram of system architecture for said apparatus;

DETAILED DESCRIPTION OF PREFERRED EMBODIMENTS

Figure 3:
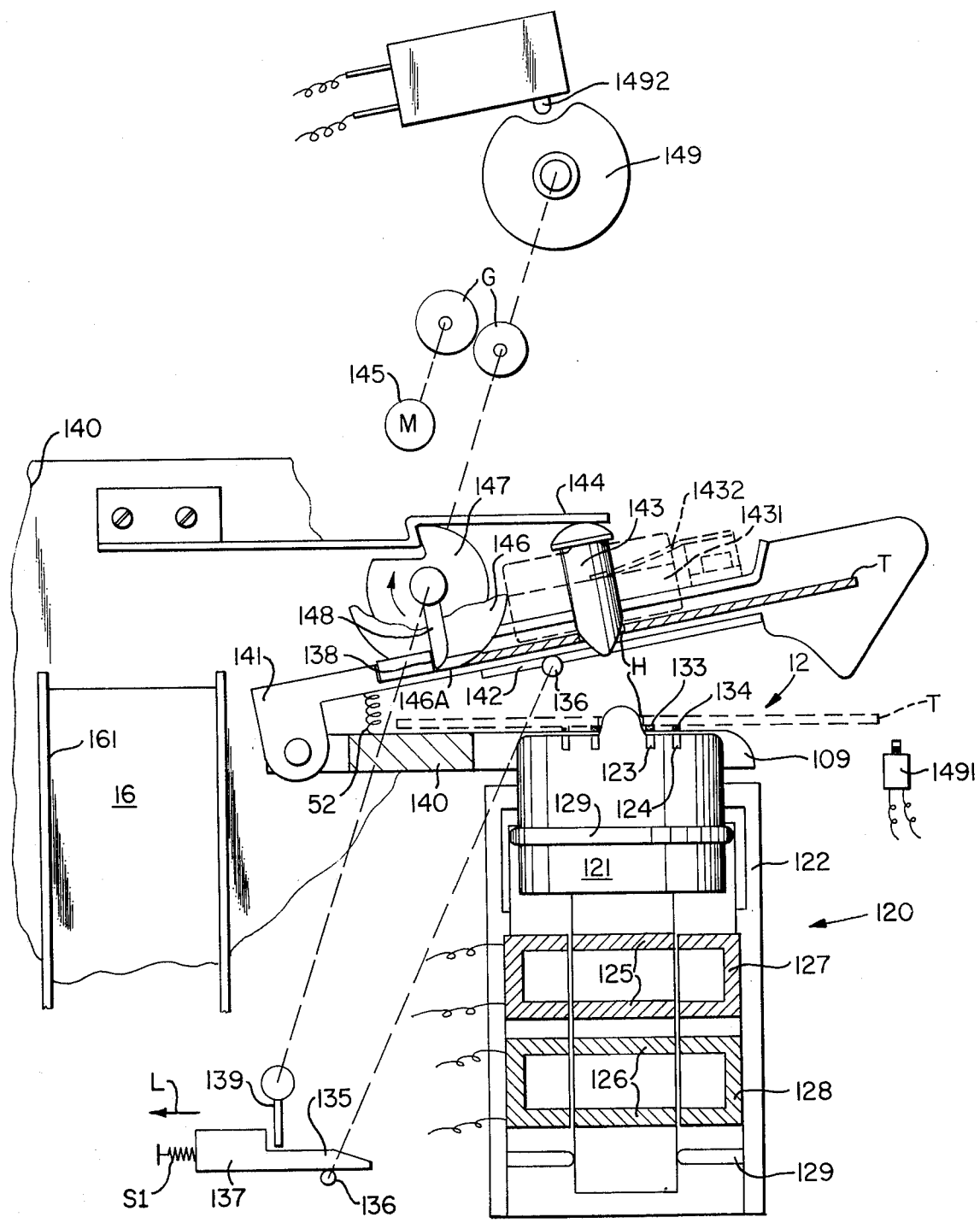
FIG. 3 is a sectioned elevation view, partly schematic of the ticket reading and writing component of said apparatus.

Referring now to FIG. 1, there is shown a data collecting console 10 comprising the ticket reading and writing section 12 with a ticket entrance 14 and a ticket exit 16, discharging tickets into a collection box 18. A front face of the console comprises a numerical display 20 and a function prompting display 22, comprising panels with alphanumeric information which may be back lighted. The numeric display may comprise solid state diode indicators. The apparatus further comprises a keyboard 24 for punching in numeric information and for function selection information and a lock 26. A portion 28 of the console houses a data storage medium such as a tape belt or disc, preferably a flexible disc known in the art as a "diskette." A drive for the diskette is contained in section 28.

FIG. 1A is an isometric blow-up of the reader 12 showing an inserted ticket T with the visual price field ($) visible for reading by the operator for comparison with price information displayed at 20. The ticket is inserted through opening 14 onto a pivotal platform 142 and is aligned by sidewall guides 121 and 122 so that a hole H in the ticket can be engaged by a spring loaded pin 143. After reading/writing processing, a motor driven wheel 147 is automatically activated to engage the ticket and drag it by friction to the exit 16 for ejection.

The ticket may be of the type described in U.S. Pat. No. 3,727,031 and comprises a magnetic coating on its lower surface and visible information on its upper surface.

During the reading/writing the ticket is flattened out by a spring loaded upper anvil thereon (not shown) which may be released manually to withdraw a defective ticket through opening 14.

A transducer with associated rotary transformer is indicated at 120.

Referring now to FIG. 2 system architecture of the apparatus comprises the above-mentioned keyboard 24, displays and 22, ticket reader 12 and a disc drive at 28. These are linked to microcomputer central processing unit 30 and read-only-memory via an input buss 36 and output buss 37 and appropriate interfaces indicated at 34 and 38.

The microcomputer preferably comprises the commercially available MCS-4 micro processor of Intel Corporation. The input buss line contains 4 bits of data lines, an input strobing line and a test line and device select lines. The output buss contains 4 bits of data lines, an output strobing line and device select lines. The C.P.U. and ROM may be interfaced via standard interface chips normally associated with the micro processor (but not shown here). The C.P.U. includes a two-phase clock generating a clock frequency of 750 kiloherz.

Referring now to FIG. 3, the ticket reader/writer is shown in further detail. It comprises a rotating magnetic head 121 interacting with a cylindrical stator body 122 and with the magnetically encoded data on tickets to be read or written. The rotor head comprises two concentric annular tracks 123 and 124 interconnected within the rotor to annular tracks 125 and 126, respectively, which interact with annular tracks 127 and 128, respectively, on the stator to define two rotary transformers. The rotor is mounted for high speed rotation via bearings 129. Tickets T with central holes H and circular magnetic tracks surrounding the hole on a bottom face are inserted one by one into the unit. The information track coatings on the ticket are indicated at 133 and 134 and they line up with rotary magnetic heads 123 and 124. Each of the tracks 123 and 124 contain gaps for reading and writing. Electrical output connections to the data processing means described below in connection with program controls, determine when head 121 is reading or writing and the ticket tracks involved.

The tickets are initially inserted into a pivotable ticket holder 141 which is pivotably mounted from fixed structure 140 of the apparatus and contains a ticket holding platform 142 and a locating pin 143 which is biased downwardly towards the ticket by a leaf spring 144. The inserted ticket raises the pin 143 against the spring action until hole H is found to allow pin 143 to drop and assure perfect location. Sidewalls (not shown) on unit 141 guide the ticket to avoid excessive hunting.

A motor 145 mounted on the fixed structure drives a capture wheel 146 which has an arc cut away to define a face 146A that can allow passage of the ticket thereunder for capture. The same motor drives a cam 147 which lifts the spring 144 during the ticket removal explained below and also drives a cam 149 for activating a microswitch. Once the ticket has been located through the use of pin 143, the pivotal unit 141 is lowered, pivoting it clockwise about its axis to bring the ticket into the position shown in phantom lines in FIG. 3. Magnetic reading and writing functions are accomplished and then, either on keyed-in command or automatically via the program, motor 145 is activated to drive wheel 146 through a single turn moving ticket T into exit slot 16 where it strikes a wall 161 and goes through a right angle turn to emerge into the collection box (see FIG. 1).

A stop pin 148 is also mounted from the common shaft to stop the common shaft at the completion of a single turn. At this same instant, cam 149 is positioned as shown in FIG. 3 with respect to the micro switch causing motor 145 to de-energize. This action causes the common shaft to attempt a reverse direction (backlash) but this is overcome by the restriction caused by spring 144 against cam 147 which is mounted from the common shaft. The mechanism is now ready to accept another ticket.

A latching face 138 of the platform engages pin 148 to effect stopping when platform 142 is up. When the platform is lowered the pin can clear the face and rotate through one revolution during which time the latching face comes up. A further pin 139 pushes latch key 137 back as indicated by arrow L against the action of compressive spring 51 to release pin 136 which is attached to platform 142 at the beginning of shaft motion. This allows latch face 138 to come up to engage pin 148 to stop the shaft after one revolution.

Platform 142 is spring biased upwardly by one or more springs 52. Lowering platform 142 brings the pin 136 thereon into engagement with the ramp face 135 of latch 137 and pin 136 is locked under latching 137 until released thereby holding down platform 142.

An anvil block 1431 is mounted on platform 142 and is biased downwardly by a yoke-form leaf spring 1432 to flatten ticket T and assure uniform spacing of tracks 133 and 134 thereon from the magnetic gap(s) of the reading/writing head.

A microswitch 1491 senses platform lowering and microswitch 1492 operated by cam 149, described above, senses the one shaft revolution incident to motor controlled platform raising (i.e. by releasing latch key 137).

Figure 4:
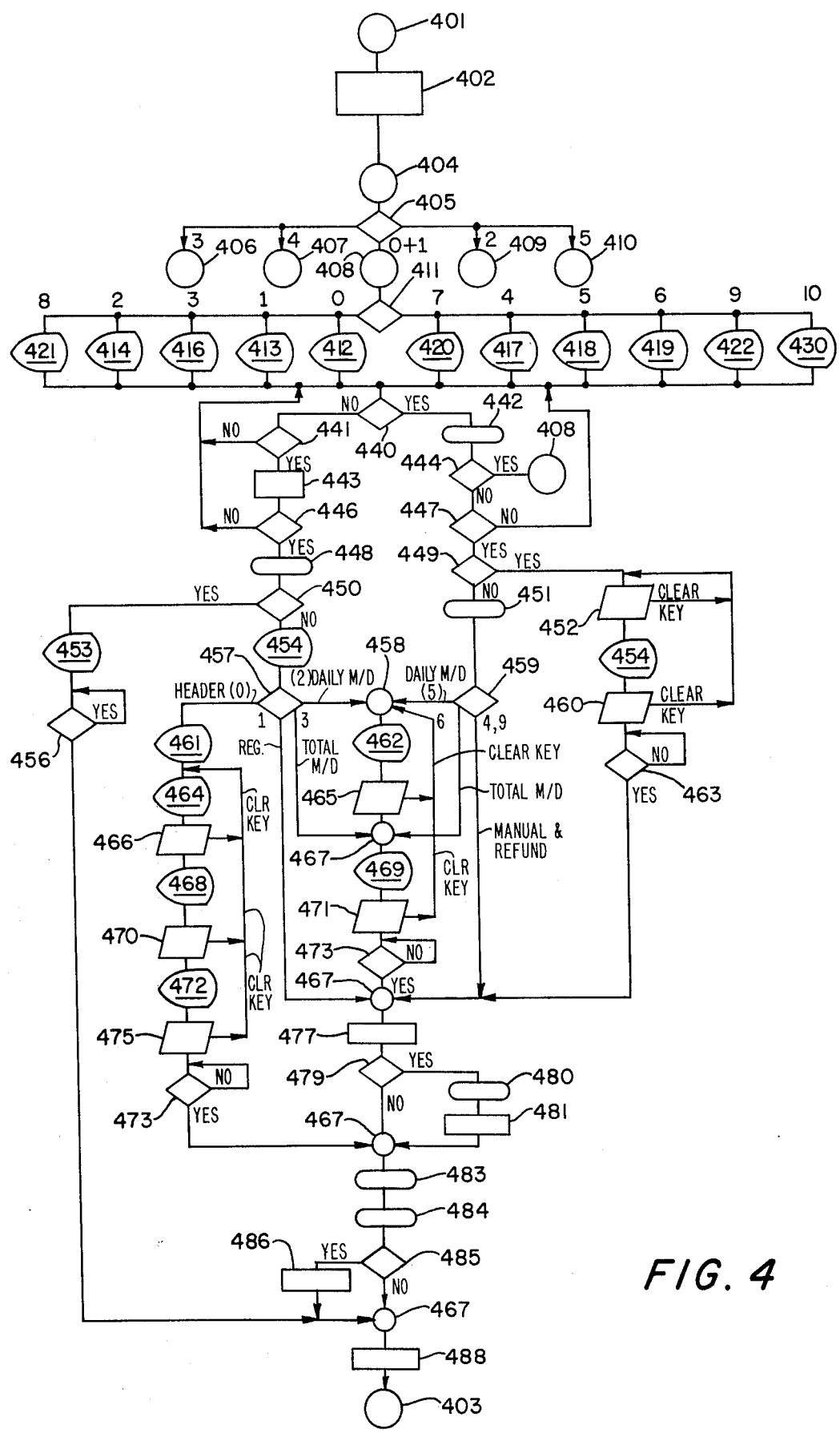
FIGS. 4 and 5 are flow charts of application programming utilizing the FIG. 1-3 apparatus.

FIG. 4 is a flow chart showing an applications program for adapting the above described data collection system for reading and collecting retail unit transactions utilizing tickets at least in part and also optionally comprising keyed in data collection for such functions as merchandise movement, payroll and dollar control and ticket marking. These unit control programs handle a data storage medium, several categories of merchandise tickets and keyed in information as follows:

a floppy disk which may contain earlier serially entered data entries with an end of data (EOD) entry (and a corresponding serial "log" for verification);

a master ticket for cue-ing the key entry of generic information e.g., sale date, current date and application code information at the beginning of a train of data entry ticket and/or key;

regular merchandise tickets containing price, department, and goods identification unchanged from original ticket printing and in undamaged and readable condition. These tickets are shown in U.S. Pat. No. 3727031 and normally attached to merchandise by the attachment means shown in U.S. Pat. No. 3103666. The information may be premarked magnetically in the magnetic coated surface and visually on the opposite surface together with simultaneous generation of home office data by machinery and methods described in U.S. Pat. Nos. 3742844, 3771670, 3715745, 3804007, and 37973863;

"daily" and "total" (or permanent) markdown tickets which are regular tickets overlaid with one or more gummed stickers showing price changes on a one-shot daily or more-or-less permanent basis.

non-machine-readable regular, daily markdown or total markdown tickets (e.g., being non-readable due to damage or excessive overlay of many gummed stickers);

"uncontrolled" (wholly handwritten or non machine printed) tickets;

any of the foregoing pertaining to layaway goods;

wholly keyed on refund return to stock (RTS), store (local) overall dollar report, store layaway and layaway return to stock with concomitant forfeiture of deposit report and totalling information.

Figure 5:
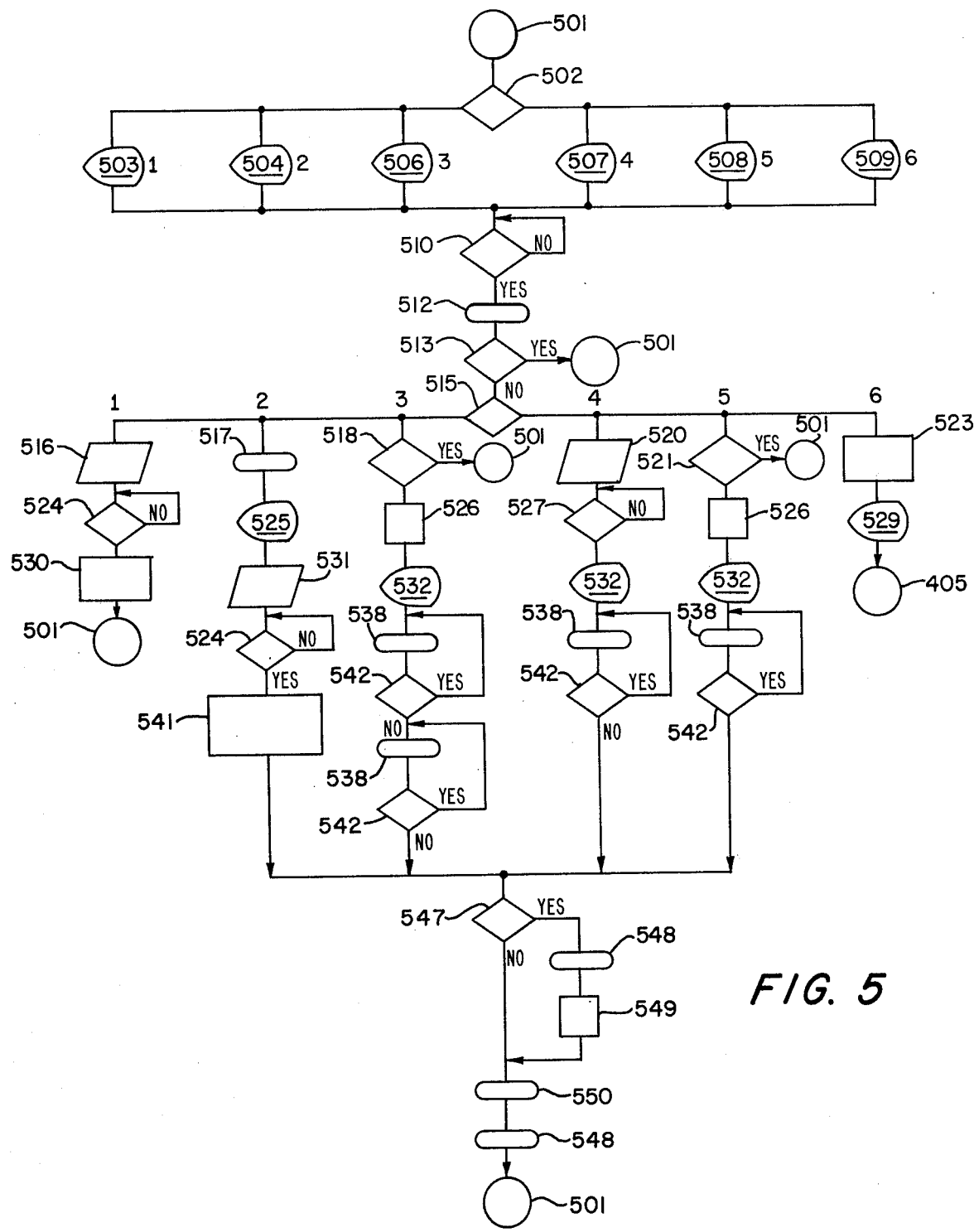

The retail unit transaction program is further developed in FIG. 4 and the dollar control program is further developed in FIG. 5. The numerical blocks thereof refer to the following subroutines or steps:

FIG. 4

| | |
|---|---|
| 401: | Initialize entry |
| 402: | Clear flag, buffers, Activity code, application code to Null. |
| 404: | (repeat) Application entry point of program |
| 405: | Application code decision |
| 406: | Merchandise movement program application entry point |
| 407: | Payroll program application entry point |
| 408: | Unit program application entry point |
| 409: | Dollar program application entry point |
| 410: | Markdown control program application entry point |
| 411: | Activity selection |
| 412: | Read master — Activity (display to operator) |
| 413: | Read regular tickets — Activity (display to operator) |
| 414: | Read daily markdown — Activity (display to operator) |
| 416: | Read total markdown — Activity (display to operator) |
| 417: | Key manual — Activity (display to operator) |
| 418: | Key daily markdown — Activity (display to operator) |
| 419: | Key total markdown — Activity (display to operator) |
| 420: | Key uncontrol — Activity (display to operator) |
| 421: | Layaway — Activity (display to operator) |
| 422: | Refund — Activity (display to operator) |
| 430: | Total — Activity (display to operator) |
| 440: | Key depression examination |
| 441: | Status less than four |
| 442: | Call total - control movement from one activity to the next upon completion. |
| 443: | Set reader flag |
| 444: | End flag set. |
| 446: | Ticket in determination |
| 447: | Status greater than four |
| 448: | Call read program to read the ticket reader - enter ticket data serially into the storage medium |
| 449: | Key uncontrolled mode selection |
| 450: | Error determination |
| 451: | Call manual entry program to enter visual ticket data by key |
| 452: | Enter and display two digits |
| 453: | Ticket error - prompter lam indication to operator |
| 454: | Price on display while reading |
| 456: | Ticket in Hold while operator removes unreadable ticket |
| 411: | Activity selection |
| 458: | Intermediate Junction |
| 459: | Status |
| 460: | Enter and display 2-3 digit instruction |
| 461: | Store number display |
| 462: | Key authorization code |
| 463: | Enter key |
| 464: | Sale date display |
| 465: | Enter and display two digits |
| 466: | Enter and display six digits |
| 467: | Connector |
| 468: | Todays date display |
| 469: | Key markdown price |
| 470: | Enter and display six digits |
| 471: | Enter and display two or four digits |
| 472: | Application code |
| 473: | Enter key depressed determination |
| 475: | Enter and display one digit |
| 477: | Add price count ticket |
| 479: | Total Flag |
| 480: | Call Diskette program |
| 481: | Clear Total Flag |
| 483: | Call Edit program (squeeze) |
| 484: | Call Diskette program |
| 485: | Reader flag set |
| 486: | Move ticket (i.e. start motor to eject ticket) |
| 490: | Clear reader flag |
| 501: | Dollar Junction |
| 502: | Activity selection |
| 503: | Key ticket totals display to show activity selected |
| 504: | Key return to stock layaway display to show activity selected |
| 506: | Local report display to show activity selected |
| 507: | Layaway report page number display to show activity selected |
| 508: | Key return to stock display to show activity selected |
| 509: | Cash totals display to show activity selected |

FIG. 4-continued

| | |
|---|---|
| 510: | Key depressed examination |
| 512: | Call total program |
| 513: | End flag set |
| 515: | Activity selection |
| 516: | Enter and display 2-8 digits |
| 517: | Call manual entry of tag data program |
| 518: | Pass flag set determination |
| 520: | Enter and display 2-7 digits |
| 521: | Pass flag set determination |
| 523: | Sum lines and Set application code to zero activity |
| 524: | Enter key depressed determination |
| 525: | Sale date display |
| 526: | Set pass flag |
| 527: | Enter key depressed determination |
| 529: | Number of lines summary |
| 530: | Increment status output |
| 531: | Enter and display 6 digits |
| 532: | Line number display |
| 405: | Application Junction (FIG. 4) |
| 538: | Call line entry subroutine |
| 541: | Add price, store date, authorization and markdown field. Increment ticket count |
| 542: | Clear determination |
| 547: | Total flag |
| 548: | Call Diskette |
| 549: | Clear total flag |
| 550: | Call edit program (to squeeze) |

The operator's interactive operation of the foregoing program is shown in the following tables 1 and 2 (indicating too, the keys and displays made available for operation of the foregoing program) for unit control and dollar control respectively:

Further subroutine detail of the exemplary programs will be obvious to those skilled in the art from the foregoing description of FIGS. 1-5 and accompanying text and tables 1-2.

Figure 6:
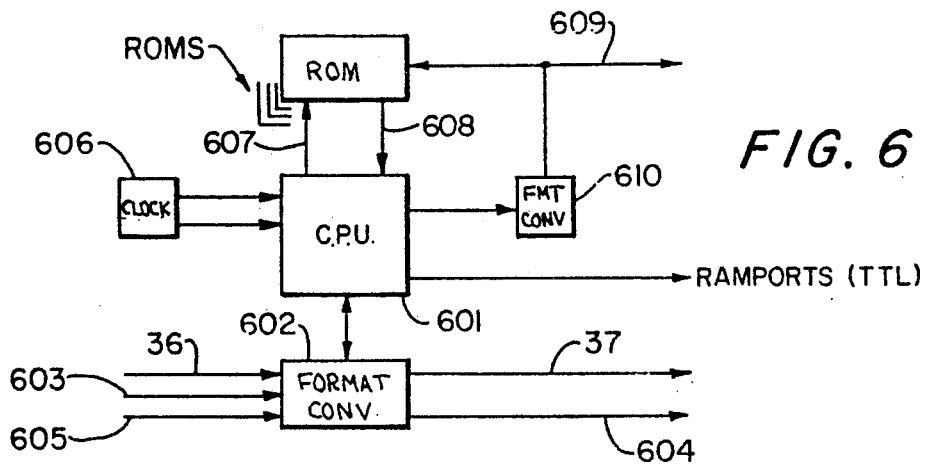
FIG. 6–10 are block diagrams of detailed portion of the FIG. 2 architecture.
Figure 7:
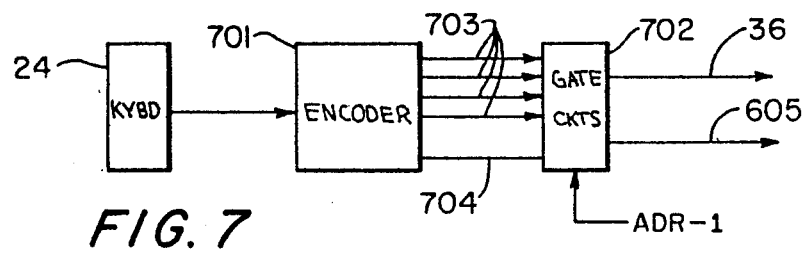

The overall system architecture for implementing the exemplary programs (or other programs of the same type) has been described above in connection with FIG. 2. Subsystems thereof are now shown in FIGS. 6-10 as follows:

FIG. 6. PROCESSOR (30 percent of FIG. 2)

Data input and output busses 36 and 37 interface on inter MCS-4 C.P.U. microprocessor 601 via format converter 602. Input and output stroking pulses are applied via lines 603, 604 and a test line 605 also accesses the equipment. A 2 phase clock (750 kiloherz) 606 controls timing and the C.P.U. communicates with

TABLE 1

UNIT CONTROL FUNCTION

| OPERATOR ACTION | START UP | TERMINAL RESPONSE |
|---|---|---|
| Turn power on to start up | | |
| | LAMP TEST | |
| Insert diskette after removing EOD log. Note information in last entry. | | |
| | DISKETTE CONTROL EVENT | |
| If displayed EOD equals last EOD on label press ENTER. If not, press CLEAR, then ENTER | | |
| | READ MASTER EVENT | |
| Record starting EOD log. | | READ MASTER displayed. |
| Insert Master ticket in the reader. | | Store number read and displayed |
| | | SALE DATE displayed. |
| Key 6 digit date | | Date displayed |
| | | TODAYS DATE displayed |
| Key 6 digit date | | Date displayed. |
| | | APPLICATION TYPE displayed. |
| Key single digit application code. (1 is unit control) Press ENTER. | | Number displayed |
| | EVENT: READ REGULAR TICKETS | |
| | | READ REGULAR TICKETS is displayed if 1 was keyed under Read Master Event. |
| Insert ticket in the reader until locating pin drops into center hole. Then depress read lever (i.e. lower the platform to bring the ticket to the transducer as described above in connection with FIG. 3). | | |
| | | If read is good, an audible tone signals that the ticket has been read. Price is displayed, ticket is ejected, and reader is ready to accept next ticket. See Error Correction - Ticket Reading |
| Repeat the procedure for each ticket. When all regular Meritag tickets are read, press TOTAL to terminate the event. | | |
| | EVENT: READ DAILY (DLY) MARKDOWN (M/D) | |
| | | READ DLY M/D displayed. |
| Place ticket in the reader until locating pin drops into center hole, then depress read lever | | If read is good, price displayed. KEY AUTHORIZATION NUMBER displayed. |
| Key 2 digit authorization number. | | |
| | | Each digit displayed. KEY M/D PRICE displayed. |
| Key price as read from visible bottom label of ticket | | |
| | | Each digit displayed. |
| Terminate price field with ENTER | | Ticket completion is |

TABLE 1-continued

UNIT CONTROL FUNCTION

| OPERATOR ACTION | START UP | TERMINAL RESPONSE |
|---|---|---|
| key. | | signaled by an audible tone. Ticket ejected from reader READ DLY M/D displayed. |
| Press TOTAL key to terminate event when all Daily Markdown tickets are read. | | |

EVENT: READ TOTAL MARKDOWN

| | |
|---|---|
| | READ TOTAL M/D displayed. |
| Place ticket in the reader | If read is good, price displayed. |
| | KEY M/D PRICE Displayed. |
| Key price from bottom label of ticket. | Each digit displayed |
| Terminate price field with ENTER key. | Ticket completion is signaled by an audible tone. Ticket ejected from reader. READ TOTAL M/D displayed. |
| Press TOTAL key to terminate event when all Daily Markdown tickets are read. | |

EVENT: KEY REGULAR TICKETS

| | |
|---|---|
| | KEY regular tickets displayed |
| Enter all non-readable tickets. | DEPT displayed |
| Key 3 digits | MFG displayed |
| Key 4 digits | COLOR displayed |
| Key 2 digits | STYLE displayed |
| Key 4 | ITEM displayed |
| Key 4 digits | PRICE displayed |
| Key 2 to 4 digits | |
| Terminate price with ENTER key | Ticket completion is signaled by an audible tone. DEPT is displayed |
| Repeat procedure for each ticket When all tickets read, terminate by pressing TOTAL key | |

EVENT: KEY DAILY MARKDOWN

| | |
|---|---|
| | KEY DLY M/D displayed |
| Enter all non-readable daily markdown tickets. | DEPT displayed. |
| Key 3 digits | MFG. displayed |
| Key 4 digits | COLOR displayed |
| Key 2 digits | STYLE displayed |
| Key 4 digits | ITEM displayed |
| Key 4 digits | PRICE displayed |
| Key 2 to 4 digits | |
| Press ENTER | KEY AUTHR NO displayed. |
| Key 2 digit authorization number. | Key M/D PRICE displayed |
| Key 2 to 4 digit price from ticket | Ticket completion is signaled by an audible tone. |
| Terminate price field with ENTER key | Key DLY M/D displayed |
| When all manual Daily Markdowns completed, terminate with TOTAL key. | |

KEY TOTAL MARKDOWN

| | |
|---|---|
| | KEY TOTAL M/D displayed. |
| Enter all non-readable total M/D tickets. | |
| Key 3 digits | MFG displayed |
| Key 4 digits | COLOR displayed |
| KEY 2 digits | STYLE displayed |
| Key 4 digits | ITEM displayed |
| Key 4 digits | PRICE displayed |
| Key 2 to 4 digits | |
| Press ENTER | KEY M/D PRICE displayed. |
| Key 2 to 4 digit price from ticket. | An audible tone signals ticket completion. |
| Terminate price field with ENTER key. | KEY TOTAL M/D display. |
| When all TOTAL Markdowns completed, terminate with TOTAL key. | |

KEY UNCONTROLLED

| | |
|---|---|
| Press ENTER | KEY UNCNTRL displayed. DEPT. displayed. |
| Key 2 digit department | PRICE displayed. |
| Key 2 to 3 digit price | |
| Terminate price with ENTER key. | An audible tone signals that the ticket has been entered. DEPT displayed. |
| When all uncontrolled tickets complete, terminate with TOTAL key. | |

LAYAWAY EVENT

| | |
|---|---|
| | LAYAWAY displayed in addition to all other terminal displays given for each event. |
| Repeat the procedure for each ticket type starting with read key | |

TABLE 1-continued

UNIT CONTROL FUNCTION

| OPERATOR ACTION | START UP | TERMINAL RESPONSE |
|---|---|---|
| TKTS. | | |
| | REFUND EVENT | |
| | | KEY REFUND displayed. |
| Key in Department number (3 digits) | | DEPT. displayed. |
| Key in MFG. number (4 digits) | | MFG displayed. |
| Key in COLOR number (2 digits) | | COLOR displayed |
| Key in STYLE number (4 digits) | | STYLE displayed |
| Key in ITEM number (4 digits) | | ITEM displayed |
| Key in PRICE number (2 to 4 digits) | | PRICE displayed |
| Terminate price with ENTER key | | An audible tone signal completion of ticket |
| | | DEPT displayed |
| Repeat procedure for each ticket. | | [Ticket Data is Completely |
| Terminate by pressing TOTAL key. | | Entered] |
| | EVENT: TICKET TOTAL | |
| | | TOTAL displayed. Up to 8 digit dollar total is displayed. This is total dollars for all tickets entered (excluding Layaway and Refund). |
| This total must be written and saved to be used as the first entry of the Dollar Control Function. Terminate event with TOTAL key. | | |
| | | EOD displayed. |
| Record EOD on EOD log (label). Unit may be shut down or operation may be continued by pressing ENTER. | | |

Dollar Control

Table 2 below gives the sequence of events, operator actions, and machine responses to each action for the completion of the dollar control function.

TABLE 2

DOLLAR CONTROL FUNCTION

| OPERATION ACTION | TERMINAL RESPONSE |
|---|---|
| Turn power on to start up | |
| Insert diskette after removing EOD log. | |
| Note information in last entry. | |
| Press CLEAR | |
| DISKETTE CONTROL | |
| If displayed EOD equals last EOD on label press ENTER. If not press CLEAR, then ENTER. | EOD displayed. |
| READ MASTER | |
| Record starting EOD on log. | READ MASTER displayed. |
| Insert Master ticket in the reader. | Store number read and displayed/ |
| | SALE DATE Displayed. |
| Key 6 digit date | Date displayed. |
| | TODAYS DATE displayed. |
| Key 6 digit date | Date displayed. |
| | APPLON TYPE displayed |
| Key single digit application code. (2 is dollar control). | Number displayed |
| Press ENTER | |
| KEY TICKET TOTAL | |
| | KEY TKT TOTAL displayed. |
| Key ticket total taken from Ticket Total Event of Table 1. | |
| Press ENTER. | |
| LAYAWAY RETURN TO STOCK (RTS) | |
| Terminate event with TOTAL key. | LAYAWAY and KEY RTS displayed. |
| Enter all RTS data. | DEPT displayed. |
| Key 3 digits | MFG displayed |
| Key 4 digits | COLOR displayed |
| Key 2 digits | STYLE displayed |
| Key 4 digits | ITEM displayed |
| Key 4 digits | PRICE displayed |
| Key 2 to 4 digits | |
| Terminate price with ENTER key | SALE DATE displayed. |
| Key 6 digit date (month, date, year) | |
| Press ENTER | An audible tone signals entry is complete. |
| Terminate event with the TOTAL Key. | |
| POST LOCAL REPORT | |
| | KEY LOCAL displayed |
| | LINE NUMBER displayed |
| | 1 displayed |
| Key Register Sales, Line 1, from Daily Licensee Report | |

TABLE 2-continued
DOLLAR CONTROL FUNCTION

| OPERATOR ACTION | TERMINAL RESPONSE |
|---|---|
| Press ENTER. | |
| | 2 displayed |
| Key O.K.'d Errors, line 2 | |
| Press ENTER | |
| | 3 displayed |
| Key Total Refunds, Line 3. | |
| Press ENTER | |
| | 4 displayed |
| Key Cash Over, Line 4 | |
| Press ENTER | |
| | 5 displayed |
| Key Cash Short, line 5 | |
| Press ENTER | |
| | 6 displayed |
| Key Adjustments (+), | |
| Line 6. Press ENTER | |
| | 7 displayed |
| Key Adjustments (−), | |
| Line 7. Press ENTER. | TOTAL displayed. |
| If the total displayed agrees with the total of Lines 1 through 7 on the Daily Licensee Report, press the ENTER key. If the totals do not agree, press the CLEAR key and press ENTER for each line that is correct starting with Line 1. When this incorrect entry is found, press CLEAR then key in the correct information. Press ENTER. | |
| | 8 displayed |
| Key Payroll Cash Advan., | |
| Line 8. Press ENTER | |
| | 9 displayed |
| Key Freight Bills Paid, | |
| Line 9, Press ENTER. | |
| | 10 displayed |
| Key Telephone Charges, | |
| Line 10. Press ENTER. | 11 displayed. |
| Key Misc. Charges, | |
| Line 11. Press ENTER. | Total of Lines 8 through 11 displayed. |
| If the displayed total and the total on the Daily Licensee Report agree, terminate this Event with the TOTAL key. If the totals do not agree, press ENTER for each line that is correct starting with line 8. When the incorrect entry is found, press clear, then key in the correct information. Press ENTER. Terminate Event with the Total key. | |
| | LAYAWAY REPORT displayed. |
| POST LAYAWAY REPORT | |
| | PAGE NUMBER displayed |
| Key 7 digit page number | |
| Press ENTER. | |
| | LINE NUMBER displayed. |
| | 1 displayed. |
| Key new layaway sales. | |
| Press ENTER. | 2 displayed. |
| Key Service charge. (5 digit max.) | |
| Press ENTER. | 3 displayed. |
| Key Total layaway sales. | |
| Press ENTER. | 4 displayed. |
| Key total layaway | |
| collection. Press ENTER. | TOTAL displayed. |
| Display page total dollars (8 digit max.). If correct, press ENTER key to continue. If incorrect, press CLEAR key to return to Line 1 and press ENTER for each line that is correct. When the incorrect entry is found press clear, then key in the correct information. Press ENTER. | |
| | PAGE NUMBER displayed |
| Repeat above procedure for each page. When complete, press TOTAL key to terminate. | |
| POST LAYAWAY RTS | |
| | KEY RTS displayed. |
| | LINE NUMBER displayed. |
| | 1 displayed. |
| Key layaway converted to charge. | |
| Press ENTER. | |
| | 2 displayed. |
| Key merchandise RTS | |
| Press ENTER. | |

TABLE 2-continued
DOLLAR CONTROL FUNCTION

| OPERATOR ACTION | TERMINAL RESPONSE |
|---|---|
| Key unpaid balance on RTS. Press ENTER | 3 displayed. |
| Key layaway forfeiture refunds. Press ENTER | 4 displayed. |
| If the displayed total and the report total agree, press ENTER. If they do not agree, press CLEAR to return to Line 1 and press ENTER for each line that is correct. When the incorrect entry is found press clear, then key in the correct information. Press ENTER. Terminate the Event with the Total key | Total dollars accumulated displayed. |
| CASH TOTAL | |
| | CASH TOTAL displayed. Up to 8 digit dollar total displayed. |
| Terminate function with TOTAL key. Record EOD on EOD LOG (label). Use felt tip pen. Unit may be turned off with key or operation continued by pressing ENTER. | EOD is displayed. | read only memories (ROMS), via an address buss 607 and data buss 608 and with address lines ADR- via a format converter 610.

FIG. 7 KEYBOARD (FIGS. 2, 24) ENCODING

The keyboard 24 acts through an encoder 701 to provide signals to tri-state gate circuits 702, via lines 703 along with a key down signal via line 704 and an address line ADR-1, for data input buss (56) driving. The system software provides for the C.P.U. polling each key switch when expecting an input signal and no other time to eliminate stray key bounce signals as a source of error.

FIG. 8 - NUMERIC DISPLAY (20, FIG. 2)

Figure 8:
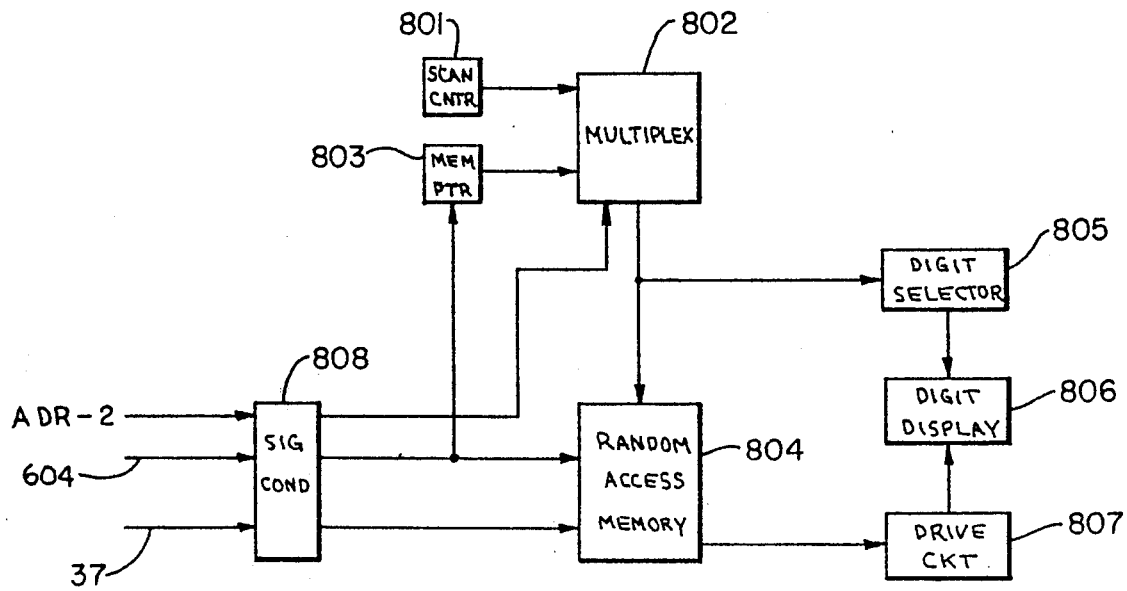

FIG. 8 shows that the numeric display comprises a scan counter 801, multiplexing incent 802, a memory pointer 803, a random access memory 804, digit selector 805, digit display(s) 806 and a deciding / driving circuit 807, all accessed by an address line ADR-2, output strobe line 604 and data output buss 37 via a signal conditioner 808. The display is driven under program control.

FIG. 9 PROMPTER DISPLAY (22 FIG. 2)

Figure 9:
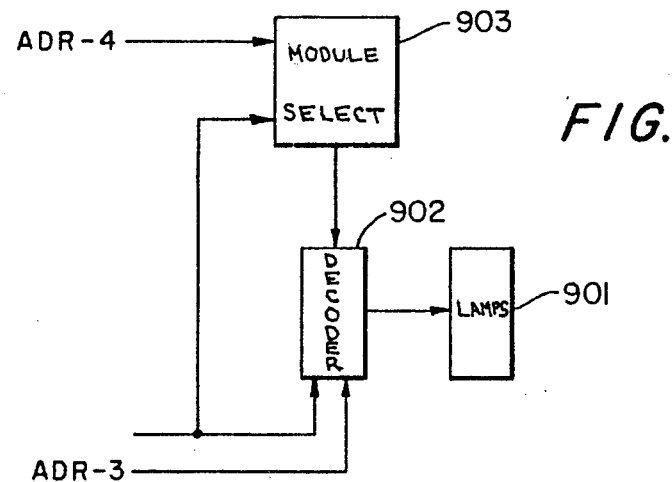
Figure 10:
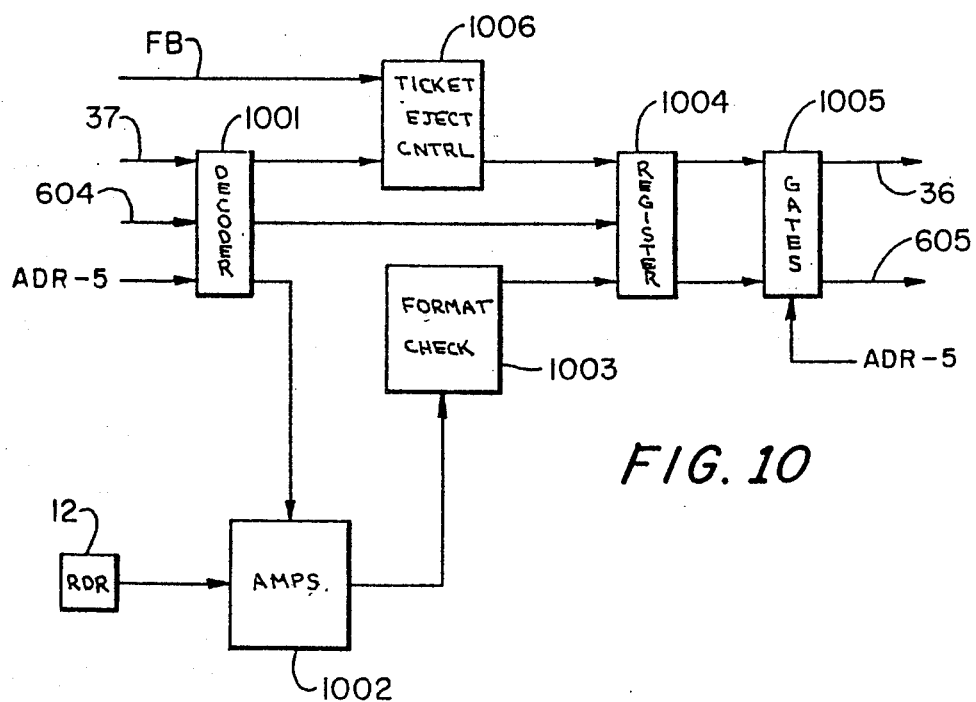

FIG. 9 shows that the prompter comprises one or more lamps or banks of lamps 901 accessed via decoder/driver 902 which are controlled by the data output buss 371 output strobe line 604, address line ADR-3 and a module selector 903 in turn controlled by address line ADR-4.

FIG. 10 - TICKET READER INTERFACE

The interface utilizes a command decoder 1001, two reading transducers (not shown) within the reader 12 (FIGS. 2, 3) and associated amplifier(s) 1002, a format checker 1003, a register 1004, tri-state gates 1005 with input from 1004 and address line ADR-5 and providing signals to data input buss 36 and test line 605. Feedback signals FB from microswitching associated with the reader and command decoder 1001 operate a motion control mechanism 1006 for ticket eject motor action. Commands received at 1001 (via 37) may comprise moving the ticket, selecting an outer ticket track for reading, selecting an inner ticket track for reading, selecting a status sensing function (e.g. is the ticket positioned?Sense via microswitch and selecting data from the track being read).

Further elaboration of hardware detail is a matter of routine implementation of the above described hardware organization in accordance with skill of the art to meet the above exemplary requirements of operator-machine interaction for data collection.

It will be appreciated that the above data collection system may be applied to equivalent data collection applications in manufacturing control and/or materials management, student registration, warehousing and transportation, census polling, disbursing goods and/or payments, and the like.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:
1. A data collection system comprising
a ticket carrying encoded information in at least one rotary track;
means for loading said ticket into said system;
means for shifting said ticket from its loading position into an operative position;
means, including a transducer with a rotary head coupled to a rotary transformer, for reading information from said ticket;
means for shifting said ticket out of said operative position;
means for automatically ejecting said ticket;

means for processing information read from said ticket for transmission to a storage medium in accordance with a stored program;
means for keying information into the processing means in accordance with a preselected function;
means for selecting functions;
means for shifting the ticket out of said operative position; and
means for automatically ejecting said ticket.

2. A data collection system comprising
a ticket carrying encoded information in at least one rotary track;
a cumulative data storage medium for storing information in said rotary track;
means for reading information from said ticket in accordance with a preselected function;
means for processing information read from said ticket for transmission to said storage medium in accordance with a stored program;
means for keying information into the processing means in accordance with a preselected function;
means for selecting functions for the reading and keying of information;
means for displaying notices for the prompting of functions in response to said stored program;
means for interactively displaying information read from said ticket and keyed into said processing means;
the reading means comprising a transducer for reading information while the transducer and said track are in close proximity and undergoing rapid relative movement;
means for loading said ticket including resilient ticket locating means;
means for shifting said ticket from an initial loading position into an operative position relative to said transducer;
means for shifting the ticket out of said operative position;
means in the form of a motor driven mechanism for automatically ejecting said ticket;
means responsive to the movement of said platform for initiating reading and display functions; and
means responsive to completion of said functions to move said platform in a reverse direction and initiate the motor driven ticket ejection.

3. A data collection system comprising
a ticket carrying encoded information in at least a single track thereon;
a cumulative data storage medium for information in said track;
means for reading information from said ticket in accordance with a preselected function;
means for processing information read from said ticket for transmission to said storage medium in accordance with a stored program;
means for keying information into the processing means in accordance with a preselected function;
means for selecting functions for the reading and keying of information;
means for interactively displaying information read from said ticket and keyed into said processing means;
the reading means comprising
a transducer for reading information while the transducer and said track are in close proximity and undergoing rapid relative movement and signal processing input and/or output means for said transducer means;
means in the form of a movable platform and including resilient ticket locating means for loading said ticket;
means for shifting said ticket from an initial loading position into an operative position relative to said transducer;
means for displaying notices for the prompting of functions; and
means for interactively displaying information read from said ticket and information keyed into said processing means.

4. A data collection system comprising
means for moving a data card into an operative position;
means for reading information carried by said data card at said operative position;
means for displaying the information read from said data card
means responsive to the movement of said data card for initiating the reading of said card and the display of information read therefrom; and
means responsive to the completion of the reading of said data card and the display of information read therefrom for ejecting said card from the system.

* * * * *